United States Patent Office 3,478,648
Patented Nov. 18, 1969

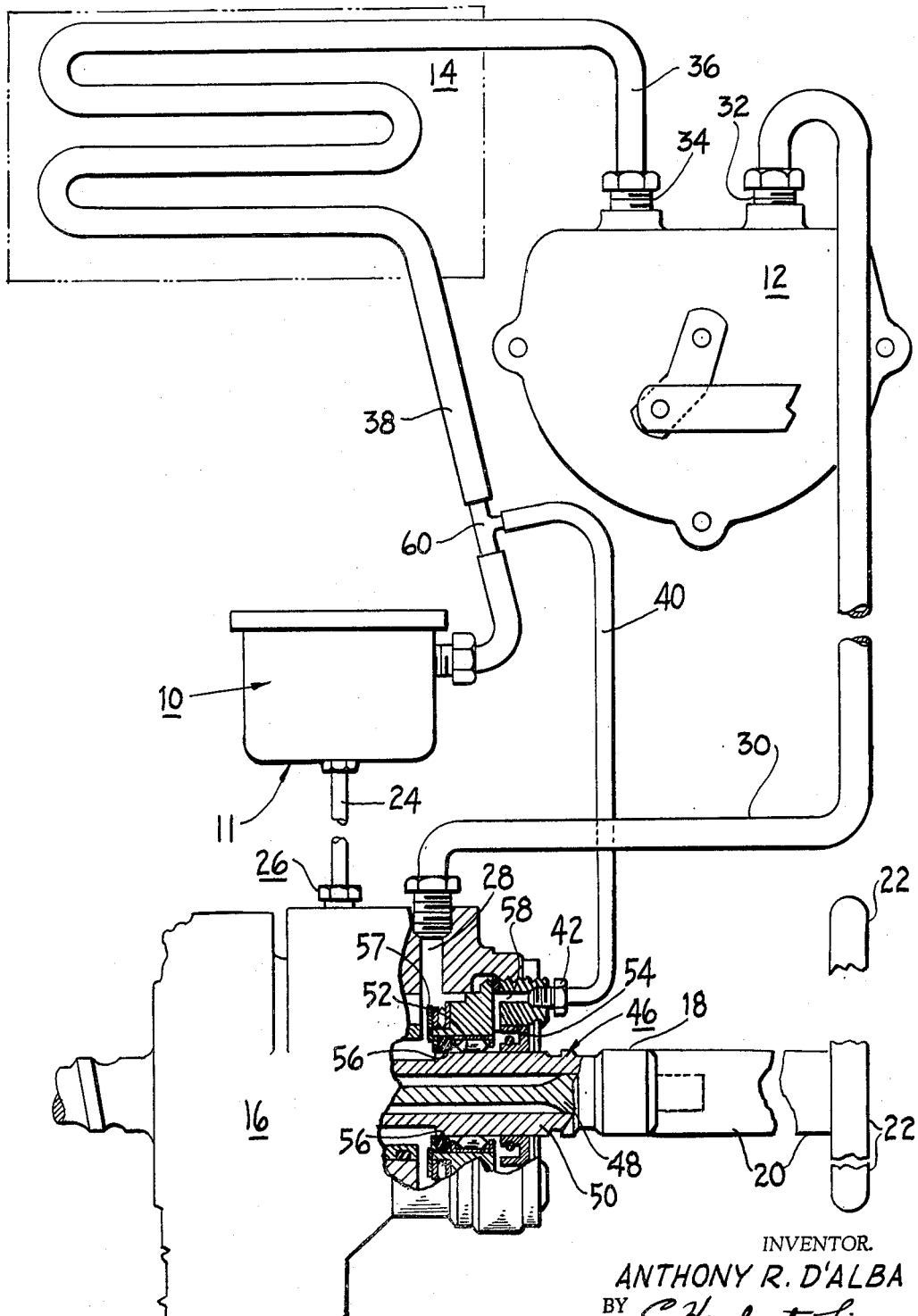

3,478,648
FLUID SYSTEM
Anthony R. D'Alba, Williamsville, N.Y., assignor to
Trico Products Corporation, Buffalo, N.Y.
Filed Apr. 22, 1968, Ser. No. 723,001
Int. Cl. F15b 11/16, 21/04, 15/20
U.S. Cl. 91—411
8 Claims

ABSTRACT OF THE DISCLOSURE

An hydraulic system incorporating a fluid pump, a power steering control valve and gearbox assembly, a heat exchange coil and an hydraulic windshield wiper motor. A pressure relief bypass circuit is provided to relieve back pressure on a lip seal in the power steering control valve housing through which a rotatable operating shaft extends. The lip seal provides a closure for the control valve housing assembly.

Background of the invention

The invention relates to an hydraulic system for motor vehicles including power steering apparatus and, more particularly, to an improved control valve construction. The invention is an improvement on a system utilizing known types of power steering control valves. It is particularly useful in applications where auxiliary fluid operated equipment such as hydraulic windshield wiper motors and/or other hydraulically operated power consuming apparatus is connected in circuit with the power steering pump.

Although its advantages are most apparent in such a system, substantial improvement is achieved where the power steering pump supplies only the power steering gear through a control valve. The power steering control valve is operated by a shaft coupled to a manually operated steering column. The shaft is rotatably received in an opening in a lip seal which forms a liquid tight seal for the valve housing. In a system with or without additional hydraulic equipment in the circuit, substantial back pressure is applied to the control valve housing. It acts on the lip seal to increase the frictional engagement with the shaft, thereby increasing the torque required to rotate the shaft and the associated control valve. A substantial portion of the advantage of the power steering system is lost due to the frictional clutch-like engagement between the control shaft and the lip seal. The resistance to turning is particularly apparent in the operation of the self-returning feature usually found in power steering systems of motor vehicles. Though the turning effort required by the operator is increased, this is not so apparent as the failure of the steering wheel to return to a neutral or central position upon completion of the turn. This effect of the back pressure is apparent to the operator when the power steering system is in a circuit by itself, but becomes even more apparent and more annoying when auxiliary equipment such as hydraulic motors or cooling coils are placed in circuit with the power steering apparatus.

Summary

The application of back pressure to the lip seal is reduced to a negligible value by the improvement of this invention which employs a relatively rigid annular sealing ring disposed about the control shaft, isolating the oil return port in the control valve housing from the lip seal or at least drastically reducing the fluid flow to the lip seal. Because of the relative rigidity of the isolating annular seal, the frictional clutching effect does not occur at the isolating seal; there is, however, a small volume of leakage. The improvement of this invention further includes a return port in the valve housing between the lip seal and the isolating annular seal, which port is directly connected to the return side of the power steering pump, thereby maintaining extremely low fluid pressure on the lip seal. The conduit connecting the latter port and the return line of the pump bypasses any auxiliary equipment which may be installed in the fluid circuit.

The principal object of the present invention is to provide an improved fluid system including power steering apparatus which permits free rotation of the power steering operating shaft relative to the seal surrounding it.

Other objects and advantages of the invention will be apparent from the detailed description taken in connection with the accompanying drawing.

Brief description of the drawing

The drawing is a schematic diagram of a power steering system illustrating the power steering valve in partial cross section.

Description of the preferred embodiment

As shown, the system comprises a fluid pump 10, a reservoir 11, an hydraulically operated windshield wiper motor 12, a cooling coil 14 and a power steering control valve and gear assembly 16. The power steering assembly 16 is coupled as at 18 to a steering column 20 rotated by a steering wheel 22. The output of the pump 10 is connected through a conduit 24 to an oil pressure port 26 in the housing of the control valve of the power steering valve and gear assembly 16. The gear assembly 16 includes an oil return port 28 which is connected through a conduit 30 to an inlet port 32 of the hydraulic wiper motor 12. The outlet port 34 of the hydraulic wiper motor 12 is connected through a conduit 36 to the input of a cooling coil 14. The outlet of the cooling coil 14 is connected through a conduit 38 to the reservoir 11 of the fluid pump 10. A bypass conduit 40 connects a bypass port 42 of the power steering control valve to the conduit 38 between the outlet of the cooling coil 14 and the inlet of the reservoir 11.

The control valve and gear assembly 16 comprises a substantially cylindrical housing having an oil pressure port 26 and an oil return port 28 extending therethrough. The oil pressure port communicates through an open center type spool valve (not shown) with one side or the other, respectively, of a rack piston (not shown) which operates a pitman shaft operatively connected to the steering linkage of a motor vehicle. The valve is operated by a control shaft assembly 46 comprising a torsion bar 48 disposed concentrically within a hollow shaft 50. The steering column 20 is coupled to the hollow shaft 50 and is turned by means of the steering wheel 22. The shaft 50 is journaled in needle bearing 52 and it extends through a lip seal 54 which forms a liquid sealing closure for the control valve housing. The lip seal 54 may be of any suitable elastomeric material. An annular isolating seal 56 of relatively rigid anti-friction material as, for example, Teflon or lubricant impregnated Teflon underlies the bearing 52 and forms a fluid restriction between the oil return port and the lip seal 54. The annular isolating seal 56 may be of O-ring configuration. It is held in place by a retaining ring 57. An internal bypass conduit 58 is formed in the housing intermediate the isolating seal 56 and the lip seal 54 and communicates through bypass port 42 to the external bypass conduit 40 which, in turn, is connected to the return conduit 38 as at T 60. Thus, back pressure is severely restricted in the region of the lip seal 54 to a negligible value. Leakage of fluid through the isolating seal is carried to the reservoir through the bypass port 42.

It should now be apparent that an improved hydraulic system for power steering with or without additional power consuming hydraulic equipment in circuit therewith has been provided which relieves pressure on the lip seal of the power steering valve to prevent frictional clutching action due to back pressure. It permits free rotation of the control shaft. A specific embodiment of the invention has been shown and described for the purpose of illustration, but it will be apparent that various modifications and other embodiments are possible within the scope of the invention. It is to be understood, therefore, that the invention is not limited to the specific arrangement shown, but in its broadest aspects it includes all equivalent embodiments and modifications which come within the scope of the invention.

What is claimed is:

1. A fluid pressure powered system for motor vehicles comprising a source of fluid pressure, a fluid reservoir and a first power consuming fluid operated device in circuit with said source of fluid pressure, said first power consuming device includes a control valve assembly comprising a housing having a fluid pressure port and a fluid return port, a control valve disposed within said housing, a resilient lip seal having an opening therethrough forming a closure for said housing, shaft means operatively connected at one end to said control valve and extending externally of said housing through said opening in said lip seal for actuating said valve mechanically by external means, restriction means disposed between said fluid ports and said lip seal for limiting fluid flow to the portion of said housing adjacent said lip seal, bypass porting means disposed intermediate said restriction means and said lip seal connected in direct fluid communication with said reservoir for carrying leakage fluid in the portion of said housing intermediate said restriction means and said lip seal to said reservoir whereby fluid pressure on said lip seal is reduced to a negligible value to thereby eliminate a clutching effect of said lip seal on said shaft.

2. A fluid pressure powered system according to claim 1 wherein said first power consuming device is a power steering control valve and gear assembly, said power source is a rotary pump and said shaft is coupled to a steering wheel.

3. A fluid pressure powered system according to claim 1 wherein said restriction means comprises a relatively rigid annular sealing ring of anti-friction material.

4. A fluid pressure powered system according to claim 3 wherein said anti-friction material is lubricant impregnated.

5. A fluid pressure powered system according to claim 1 incorporating a plurality of other power consuming fluid operated devices in circuit with said first power consuming fluid operated device.

6. A fluid pressure power system according to claim 5 wherein said first power consuming device is a power steering control valve and gear assembly and one of said other power consuming fluid operated devices is an hydraulically operated windshield wiper motor.

7. A fluid pressure powered system according to claim 1 wherein said first power consuming fluid operated device and one of said other power consuming fluid operated devices is a power steering control valve and gear assembly and one of said other power consuming fluid operated devices is a fluid cooling loop.

8. A fluid pressure powered system according to claim 1 substantially as hereinbefore described with reference to, and as illustrated in, the accompanying drawings.

References Cited

UNITED STATES PATENTS

| | | | |
|---|---|---|---|
| 2,403,325 | 7/1946 | Aemington | 60—52 |
| 3,360,932 | 1/1968 | Lech et al. | 60—52 |
| 3,414,274 | 12/1968 | Aronson | 277—15 |

EDGAR W. GEOGHEGAN, Primary Examiner

U.S. Cl. X.R.

60—52; 91—46, 444; 277—15